United States Patent
Müller et al.

[11] Patent Number: 4,574,762
[45] Date of Patent: Mar. 11, 1986

[54] DEVICE FOR TEMPERATURE RESPONSIVE SWITCHING OF OVERFLOW FUEL QUANTITIES OF A DIESEL FUEL INJECTION PUMP

[75] Inventors: Willi Müller, Sulz-Sigm; Hans Schacht, Stuttgart; Erich Scholz, Neuhausen; Max Straubel, Stuttgart, all of Fed. Rep. of Germany

[73] Assignee: Robert Bosch GmbH, Stuttgart, Fed. Rep. of Germany

[21] Appl. No.: 679,013

[22] Filed: Dec. 6, 1984

[30] Foreign Application Priority Data

Dec. 15, 1983 [DE] Fed. Rep. of Germany ....... 3345391

[51] Int. Cl.⁴ .................................... F02M 39/00
[52] U.S. Cl. .................................... 123/510; 123/511; 123/557; 123/514; 251/117; 236/48 R
[58] Field of Search .............. 123/510, 511, 512, 514, 123/516, 557; 251/117; 236/101 E, 48 R

[56] References Cited

U.S. PATENT DOCUMENTS

| | | | |
|---|---|---|---|
| 2,599,699 | 6/1952 | Dilworth | 123/511 X |
| 2,917,110 | 12/1959 | Brohl | 123/516 |
| 3,858,611 | 1/1975 | Thayer | 236/48 R |
| 4,061,265 | 12/1977 | Kitamura | 236/48 R |
| 4,133,478 | 1/1979 | Place | 236/48 R |
| 4,187,813 | 2/1980 | Stumpp | 123/510 |
| 4,262,844 | 4/1981 | Sekiya | 236/48 R |
| 4,377,149 | 3/1983 | Naylor | 123/510 |
| 4,478,197 | 10/1984 | Yasohara | 123/510 |

FOREIGN PATENT DOCUMENTS

| | | | |
|---|---|---|---|
| 2841249 | 4/1980 | Fed. Rep. of Germany | 123/510 |
| 2028921 | 3/1980 | United Kingdom | 123/510 |
| 2031994 | 4/1980 | United Kingdom | 123/511 |
| 2053354 | 2/1981 | United Kingdom | 123/510 |

*Primary Examiner*—Carl Stuart Miller
*Attorney, Agent, or Firm*—Michael J. Striker

[57] ABSTRACT

In a device for temperature responsive switching of overflow fuel quantities from a diesel fuel injection pump to a fuel supply tank or a filter of a fuel supply system a switching valve, arranged between the fuel injection pump and the tank, is actuated by a bimetallic element. Parallel to the switching valve is provided a throttle for continuous air venting. A pressure control valve with a low opening pressure is installed in the connection between the switching valve and the filter. The heated overflow fuel quantities are mixed with cool fuel from the tank and therefore the danger of clogging of the filter, which could be caused by paraffin separation, is substantially reduced.

11 Claims, 4 Drawing Figures

DEVICE FOR TEMPERATURE RESPONSIVE SWITCHING OF OVERFLOW FUEL QUANTITIES OF A DIESEL FUEL INJECTION PUMP

BACKGROUND OF THE INVENTION

The present invention relates to a device for temperature responsive switching of overflow fuel quantities from a diesel fuel injection pump to a fuel supply tank or to a filter in a fuel supply system of a diesel engine.

A temperature responsive switching device of the type under discussion has been disclosed, for example in U.S. Pat. No. 3,768,454. In the disclosed switching device a longitudinally movable piston slide is arranged in a longitudinal bore of the housing for switching the direction of diesel fuel. The piston slide is actuated by a thermostat against the action of a spring. The device with the longitudinal slide and the thermostat is rather expensive and requires a great deal of space. A further disadvantage of the known switching device resides in that the thermostat accummulates contamination particles and has a relatively great hysteresis. It is especially difficult to adjust the device during the winter time as well as during the summer time. Still another disadvantage of the known device is that the thermostat is always positioned in the main flow of the diesel fuel and therefore is exposed to the diesel fuel flowing from the tank or the mixed fuel flow and to the overflow fuel quantities from the fuel injection pump. This arrangement increases wear and hysteresis in the device first of all because no continuous air venting is possible at the start cold phase of operation, particularly in a small circuit of the overflow fuel quantity.

U.S. Pat. No. 2,917,110 discloses a filter in which the opening of the venting tube for fuel vapors is controlled by a bimetallic closing member. This filter can not be utilized for diesel fuel. The disadvantage of this filter is that the bimetallic valve member is exposed in the main flow on the clean side of the filter. Furthermore, the valve closing member is rather expensive, has a complex shape and carries out no snapping action. When the valve closing member closes the opening in the valve no continuous air venting takes place. In general there is no fuel return from the fuel injection pump in the known device.

SUMMARY OF THE INVENTION

It is an object of the present invention to provide an improved device for switching overflow fuel quantities from a diesel fuel injection pump to a fuel supply tank or a filter in a fuel supply system of a diesel engine.

It is another object of this invention to provide a device in which an efficient heating of diesel fuel would be possible with insignificant expenses and in which various requirements for satisfactory operation would be taken into consideration.

These and other objects of the present invention are attained by a device for temperature responsive switching of an overflow fuel quantity of a diesel fuel injection pump to a fuel tank or a filter of a fuel supply system, comprising a feeding connection connectable to an overflow outlet of the fuel injection pump; a fuel return connection connectable with the fuel tank; an outlet connection connectable to an inlet of the filter; a control member for switching the fuel overflow quantity; temperature-responsive means for actuating said control member, said actuating means being formed by a bimetallic element arranged so that it is surrounded only by the fuel overflow quantity from the fuel injection pump; a pressure control valve opening in a direction toward said filter and blocking said outlet connection; and a venting throttle which maintains said feeding connection in continual communication with said fuel return connection.

The switching device according to the present invention is compact and can be easily attached to available diesel fuel filters without modifications of the latter.

Due to the position of the bimetallic element only in the region of the overflow fuel flowing from the fuel injection pump the device is not subject to wear and hysteresis and is satisfactorily adjustable under various operational conditions. Furthermore, the return pressure of the overflow fuel quantity is determined accurately so that the function of the fuel injection pump is not influenced. Due to the provision of a continuous air venting diffuculties, which have always occurred during the start of the engine and during the operation, are avoided. Owing to the arrangement in the device of the venting throttle a small partial flow is always directed back to the tank under any operational condition. Therefore, air is continually removed from the system to the tank and the fuel injection system in the region between the filter and the fuel injection pump is free from air bubbles. The diesel fuel injection pump reaches operation temperatures faster; thereby an insignificant emission of noxious materials at the associated engine and a better idle running behavior of the engine are obtained. The switching device of the invention is inexpensive and compact.

The bimefallic element may be formed by a snapping bimetallic disc which also performs a function of said control member; the switching device including a housing having a valve seat, with which said bimetallic disc cooperates. The snapping effect, which results during the operation of the snapping bimetallic disc, substantially reduces hysteresis. The bimetallic disc is switched between two limiting values so that during the cool operation sufficiently great quantities of the heated fuel always flow to the filter while during the warm operation the entire overflow fuel quantities flow directly into the tank. Since, during the cool operation, such fuel flow is fed to the filter, of which about two thirds has been already filtered, the service time of the filter is substantially increased. Furthermore, the construction of the switching device including the snapping disc is very easy and inexpensive to manufacture. The snapping disc has also the function of the safety valve which limits the pressure in the overflow connection of the fuel injection pump.

The venting throttle may be arranged in the snapping disc, and particularly centrally of the snapping disc. Thereby a continuous air venting is ensured by very simple means and the function of the whole switching device is not geopardized. The advantage of this construction resides in that a partial fuel flow, leaking off for the continuous air venting, warms up or cools off the bimetallic disc much quicker so that the disc performs its switching function accurately and quickly.

The valve seat may be formed by an O-ring mounted to the housing of the switching device.

The bimetallic disc has an outer peripheral edge, said actuating means may further include a supporting spring for supporting said disc at its peripheral edge in said housing.

The housing of the switching device has two opposite sides, said feeding connection and said fuel return connection being formed in said housing at said two opposite sides, respectively, said housing further having a bore forming said outlet connection and extended transversely of said feeding and fuel return connection, and wherein a hollow bolt may be provided, which is insertable into said bore and said filter includes a cover having an inlet connection, said bolt connecting said housing to the cover of the filter at its inlet connection and receiving the pressure control valve. The above described embodiment of the switching device provides a specifically simple and reliable construction.

The housing of the switching device has a longitudinal axis through which said feeding connection and said fuel return connection extend, said housing being formed with a venting chamber, said valve seat and said disc and said venting chamber being positioned in said housing above said axis, and said hollow bolt being positioned in said housing below said axis.

The housing of the device may have a shoulder and said disc may be arranged in said housing so that during the cold operation the disc is in a closed position, in which the disc lies against said valve seat and forms at its peripheral edge with said shoulder an annular gap through which said venting chamber is in communication with said fuel return connection.

The disc may have an outer diameter which is greater than an outer diameter of said O-ring.

The outer diameter of said disc may be twice as great as the outer diameter of said O-ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
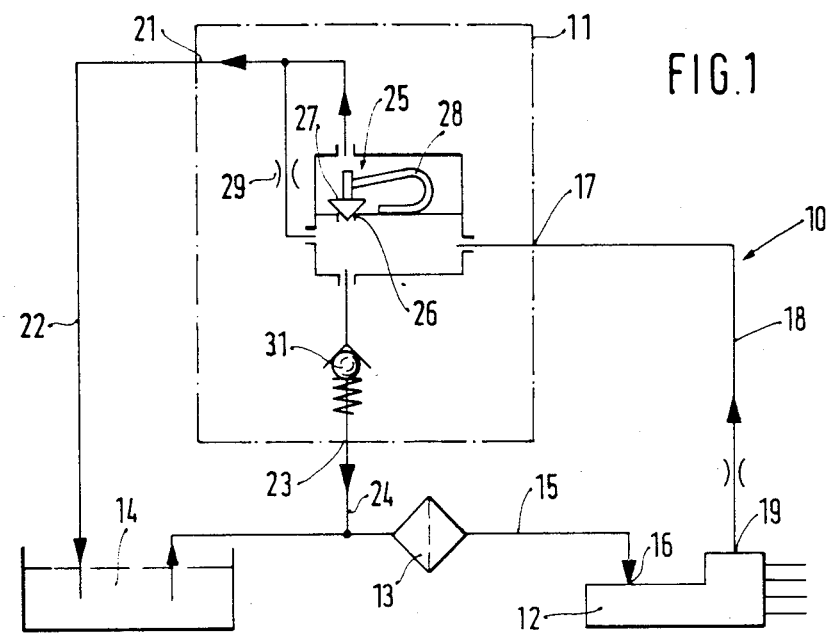
FIG. 1 is a simplified schematic view illustrating a fuel supply system with a temperature responsive switching device according to the invention.

Referring now to the drawings in detail, and firstly to FIG. 1 thereof, this figure illustrates a switch diagram of the fuel supply system generally designated by reference numeral 10. The fuel supply system 10 comprises a device 11 for temperature responsive switching of overflow fuel quantities, a diesel injection pump 12, a filter 13 and a fuel tank 14. The filter 13 is positioned in a feeding line 15, through which diesel fuel is fed from the fuel tank 14 to an inlet 16 of the fuel injection pump 12.

The temperature responsive switching device 11 has an inlet or feeding connection 17 which is connected, via an overflow conduit 18, with an overflow outlet 19 of the fuel injection pump 12. Reference numeral 21 designates a fuel return connection leading from the device 11 to a fuel return line 22 which leads to the fuel tank 14. An outlet connection 23 of the switching device 11 is in communication with a portion of the feeding line 15 by means of a conduit 24 immediately in a flow upward direction from the filter 13.

Switching device 11 includes a temperature responsive switch valve 25 which is positioned in the line between the feeding connection 17 and the fuel return connection 21. Switch valve 25 has a valve seat 26, to which a locking valve member 27 corresponds, which is actuated by means of a bimetallic element 28. Parallel to the switch valve 25 a throttle 29 for a continuous air venting is disposed in the line between the fuel feeding connection 17 and the fuel return connection 21. The feeding connection 17 generally is maintained in commincation with the outlet connection 23, and is uninfluenced by the switch valve 25, whereby a pressure control valve 31 is connected in series with the outlet connection 23. The pressure control valve 31 can open only in the direction towards the outlet connection 23. The bimetallic element 28 in the switching device 11 can operate only by an overflow fuel quantity received from the diesel fuel injection pump 12.

Figure 2:
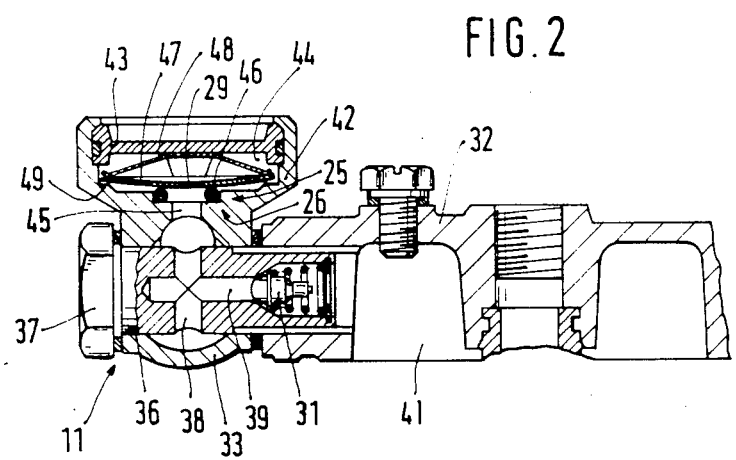
FIG. 2 is a sectional view through the device of FIG. 1 in the position attached to a filter cover.
Figure 3:
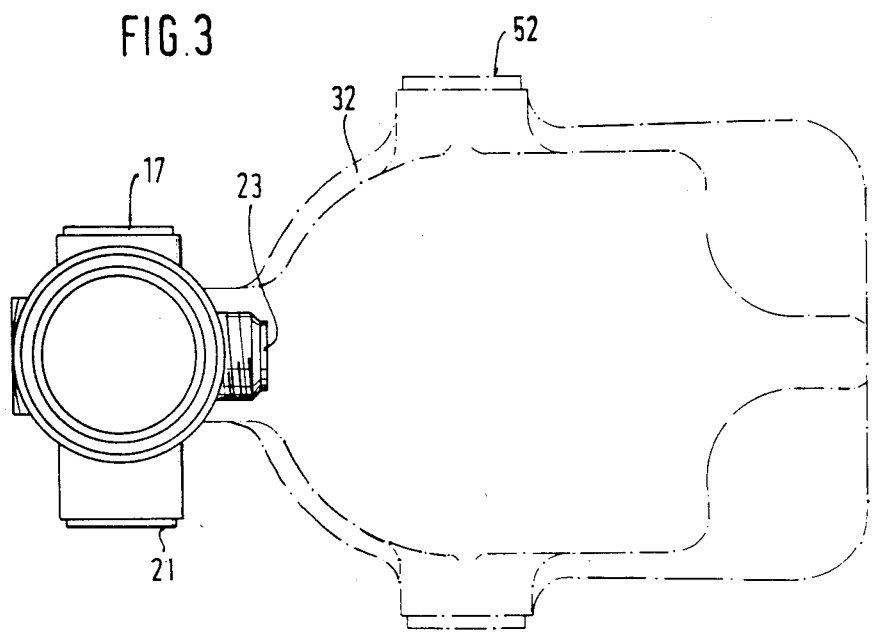
FIG. 3 is a top plan view of the device with the filter cover.
Figure 4:
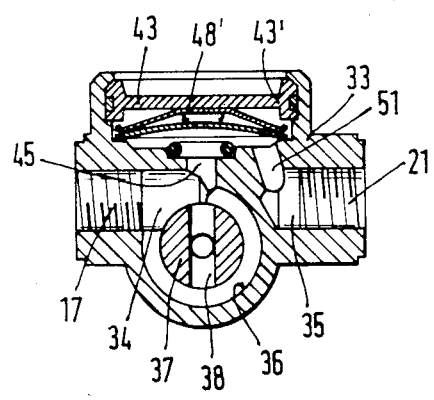
FIG. 4 is a longitudinal section through the device.

The exemplified embodiment of the switching device 11 is shown in FIGS. 2 to 4. Similar elements are denoted in FIGS. 2–4 by the same reference numerals as those in FIG. 1.

With reference to FIG. 1 it will be seen that switching device 11 is secured to a cover 32 of filter 13. The switching device 11 comprises a housing 33 in which pocket-like recesses 34 and 35, extending coaxially with each other, are formed, as shown in FIG. 4. Recesses 34 and 35 are formed at two opposite end faces of housing 33. The first recess 34 forms the feeding connection 17 while the second recess 35 constitutes the fuel return connection 21. Normally to the longitudinal axes of recesses 34, 35 extends in housing 33 a bore 36 which cuts only the recess 34. Bore 36 extends through the whole housing 33 and receives a hollow bolt 37, by means of which housing 33 is sealingly and rigidly mounted to the cover 32. The first recess 34 is in connection with a contaminated side 41 of filter cover 32 via radial passages 38 and a longitudinal passage 39 formed in the bolt 37. At the same time the pressure control valve 31 is arranged in the longitudinal passage 39 of bolt 37. Pressure control valve 31 has only an insignificant opening pressure and opens into the contaminated side 41 of the filter cover.

Housing 33 of the switching device also has a funnel-shaped enlarged extension or abutment 42 which extends outwardly from the hollow bolt 37 in the plane which is perpendicular to this bolt. A cover 43 secured in the extension 42 limits in the housing 33 a venting space or chamber 44 which is in connection with the first recess 34 via a bore 45. At the transition from the bore 45 to the pressure chamber 44 is formed the aforementioned valve seat 26 which here is formed by an O-ring 46. A bimetallic snapping disc 47 arranged in the venting chamber 44 cooperates with the O-ring 46. The bimetallic disc or plate 47 is supported at its outer rim, on the one hand, on a four-arm holding spring 48 and, on the other hand, disc 47 is positioned at a small distance from a shoulder 49, provided on the housing 33, as is the case of the locking position in the cold operation shown in FIG. 2. The outer diameter of the snapping disc 47 is greater that the outer diameter of the O-ring 46. Centrally of the snapping disc 47 is provided the throttle 29 for continuous air venting. As clearly seen from FIG. 4 a transverse bore 51 leads from the air venting chamber 44, particularly from the region thereof located between the O-ring 46 and the housing shoulder 49, to the second recess 35. In the exemplified embodiment two functions of the valve locking member 27 and the bimetallic strip or element 28 are united by the provision of the snapping bimetallic disc 47 which controls the connection from the feeding connection 17 to the fuel return connection 21 and at the same time actuates the switch valve 25 in the temperature responsive manner.

The operation of the temperature responsive switching device 11 is as follows:

In the operation of the fuel supply system 10 diesel fuel flows from the fuel supply tank 14 via the feeding line 15 and filter 13 to the inlet 16 of the diesel fuel injection pump which is of any suitable conventional structure. At the temperatures of about 0° C. a paraffin separation begins in the diesel fuel. Such paraffin separations can clog the filter 13 and thereby lead to the operation disturbances. It has been tested that, upon the warming-up of the filter or the diesel fuel, the fuel supply system 10 can also operate in the temperature range below the points of separation of paraffin and without causing the clogging of the filter 13 by the paraffin separation. It has been known that the fuel delivered to the fuel injection pump 12 is warmed-up at the fuel overflow outlet 19, whereby, depending upon the load condition, the temperature increase can reach about 5° to 15° C. The heated overflow fuel quantity flows via the feeding connection 17 into the housing 33 and also warms up the fuel accummulated in the region of the snapping bimetallic disc 47.

The bimetallic disc 47 is constructed so that at the fuel temperature of about 15° C. it takes the locking position shown in FIG. 2 so that the connection from the feeding connection point 17 to the fuel return connection point 35 becomes locked. The snapping disc 47 is in this condition curved downwardly and abuts against the O-ring 46 which serves the purpose of the valve seat 26 whereas the outer peripheral edge of the disc 47 is spaced from the shoulder 49 of the housing 33 so that, due to the annular gap formed between disc 47 and shoulder 49, the air venting chamber 44 is continually in communication with the transverse bore 51 and thereby this chamber is releived to the fuel return connection 21 and further to the fuel tank 14. The overflow fuel quantity appearing at the feeding connection 17 must therefore flow through the radial and longitudinal conduits 38, 39 and the pressure control valve 31 and the outlet connection 23 to the contaminated side 41 of filter 13. The warmed-up overflow fuel quantity flowing through the outlet connection 23 can be mixed in the filter cover 32 with cool diesel fuel fed from tank 14, for example flowing to the cover 32 via the connections 52 (FIG. 3). The mixture can then flow through filter 13 to the fuel injection pump 12. This mixed-up and heated fuel flow in filter 13 will lead to the fact that the danger of the clogging of filter 13 because of the paraffin separation will be reduced. This will take place particularly because the forcibly returned diesel fuel which represents two thirds of the flow fed to the filter is already filtered out and only about one third of the flow amount flows from tank 14 in an unfiltered state. The pressure control valve 31 builds up upwardly from the outlet connection 23 a pressure differential of about 0.3 bar; therefore it is ensured that the function of the fuel injection pump 12 is not geopardized by the high pressure in the overflow outlet 19. Furthermore, the pressure control valve 31 has the advantage which resides in that the fuel injection pump 12 can suck in no air via the overflow conduit 18 and conduit 24 during the short-time closing operation. Air bubbles occurring in housing 33 from the overflow conduit 18 and the feeding connection 17 can, during the cold operation, cause a small branched-off partial flow through the continually open throttle 29 to the fuel tank 14. Therefore the advantage of the device of this invention, which can be proven immediately from the start of the operation, resides in that air, because of its small viscosity relative to the viscosity of the diesel fuel, will be quickly removed from the device through the throttle 29 to the tank 14, and a relatively low opening pressure of the pressure control valve 31 will be first reached only when the diesel fuel flows through the overflow conduit 18. Disturbances during the start and the operation will be then avoided because the fuel injection system between the filter 13 and fuel injection pump 12 is free of air bubbles or is quickly vented.

The partial flow which continually flows during the cold operation through the throttle 29 for continuous air venting has the advantage that this partial flow moistens the bimetallic disc 47 loaded within the O-ring 46 with the warmed-up fuel from below and also from above with the warmed-up fuel so that temperature changes are quickly transmitted and the switch point of the snapping disc 47 is accurately maintained.

If the fuel overflow quantity at the feeding connection 17 finally reaches the temperature of about 40° C. the bimetallic disc 47 moves to its open position, shown in FIG. 4, and releases a passage for fuel from the feeding connection 17 to the fuel return connection 21. The pressure control valve 31 thereby becomes closed and the pressure of about 0.3 bar is built up. The switch valve 25 switches over in a striking fashion so that disturbing hysteresis does not occur. The danger of the contamination of the snapping bimetallic disc 47 is insignificant because it is surrounded only by a fuel overflow quantity and is not positioned in the main flow of the diesel fuel. Furthermore, the disc 47 is very simple and compact in construction and it ensures a reliable and robust operation. Due to the position of the bimetallic disc 47 in the flow of the fuel overflow quantity the switching device is so adjusted that the requirements for the operation during winter time and summer time as well are taken into consideration. When the disc 47 jumps to its open position according to FIG. 4 the distance between the O-ring and the disc 47 is so great that a sufficient through passage for the flowing fuel overflow quantity is obtained. The disc 47 in its open position is supported with its peripheral edge against shoulder 49 of the housing 33.

In the modified connection of the cover 43' shown in FIG. 4, as well as in the construction of FIG. 2, the switch valve 25 can carry out the function of the safety valve, whereby the bimetallic disc 47 curved in the downward direction is pressed upwardly against the force of the holding spring 48 and the fuel overflow quantity releases passage to the fuel return connection 21. The holding spring 48 can be so constructed that the safety function would occur when pressure would reach about 1 bar and the fuel injection pump would be additionally protected against malfunction.

It is understandable that other modifications of the switching device 11 are also possible. The device according to the present invention is not limited to given pressure and temperature adjustments. Housing 33 of the switching device 11 can be secured to cover 32 by means of a double hollow bolt instead of bolt 37 so that the warmed-up overflow quantity and the cold fuel flow from the tank 14 will flow through the similar feeding connections on the cover 32 to the contaminated side 41.

It will be understood that each of the elements described above, or two or more together, may also find a useful application in other types of devices for temperature responsive switching of overflow fuel quantities of diesel fuel injection pumps differing from the types described above.

While the invention has been illustrated and described as embodied in a device for temperature responsive switching of overflow fuel quantities from a diesel fuel injection pump to a fuel tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for temperature responsive switching of an overflow fuel quantity of a diesel fuel injection pump to a fuel tank or a filter of a fuel supply system, comprising a housing having a cover, an inlet, an outlet, and a fuel return opening; a feeding conduit connecting said inlet to an overflow outlet of the fuel injection pump; a fuel return conduit connecting the full return opening with the fuel tank; an outlet conduit connecting said outlet to an inlet of the filter; a control member for switching the fuel overflow quantity; temperature-responsive means integrated in said cover and operated for actuating said control member, said temperature-responsive actuating means being formed by a bimetallic element arranged so that it is surrounded only by the overflow fuel quantity from the fuel injection pump; a pressure control valve opening in a direction toward said filter and blocking said outlet; and a venting throttle which maintains said feeding conduit in continual communication with said fuel return conduit, said control member being connected in series between said feeding conduit and said fuel return conduit and being positioned in parallel with the venting throttle, said bimetallic element being formed by a snapping bimetallic disc which also performs a function of said control member; said housing having a valve seat with which said disc cooperates.

2. The device as defined in claim 1, wherein said venting throttle is arranged in said disc.

3. The device as defined in claim 2, wherein said throttle is arranged centrally of said disc.

4. The device as defined in claim 3, wherein said housing carries an O-ring which forms said valve seat.

5. The device as defined in claim 4, wherein said bimetallic disc has an outer peripheral edge, said actuating means further including a supporting spring for supporting said disc at said peripheral edge in said housing.

6. The device as defined in claim 5, wherein said housing has two opposite sides, said inlet and said fuel return opening being formed in said housing at said two opposite sides, respectively, said housing further having a bore forming said outlet and extended transversely of said inlet and fuel return opening; and wherein a hollow bolt is provided insertable into said bore, said housing and said cover being a filter housing and a filter cover, respectively, said bolt connecting said housing to said cover of the filter and receiving said pressure control valve.

7. The device as defined in claim 6, wherein said housing has a longitudinal axis through which said inlet and said fuel return opening extend, said housing being formed with a venting chamber, said valve seat and said disc and said venting chamber being positioned in said housing above said axis, and said hollow bolt being positioned in said housing below said axis.

8. The device as defined in claim 7, wherein said disc is resiliently supported at said peripheral edge by said spring so that said control member and said actuating means can additionally have a pressure-limiting function.

9. The device as defined in claim 7, wherein said housing has a shoulder and said disc is arranged in said housing so that during the cold operation the disc is in a closed position, in which the disc lies against said valve seat and forms at its peripheral edge with said shoulder an annular gap, through which said venting chamber is in communication with said fuel return conduit.

10. The device as defined in claim 9, wherein said disc has an outer diameter which is greater than an outer diameter of said O-ring.

11. The device as defined in claim 10, wherein the outer diameter of said disc is twice as great as the outer diameter of said O-ring.

* * * * *